(12) United States Patent
Vassilev

(10) Patent No.: US 12,355,749 B2
(45) Date of Patent: *Jul. 8, 2025

(54) PROVIDING DATABASE PERFORMANCE REPORT IN RESTRICTED ENVIRONMENT

(71) Applicant: SAP SE, Walldorf (DE)

(72) Inventor: Iantcho Todorov Vassilev, Sofia (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,553

(22) Filed: Jun. 4, 2024

(65) Prior Publication Data

US 2024/0323175 A1 Sep. 26, 2024

Related U.S. Application Data

(63) Continuation of application No. 17/582,868, filed on Jan. 24, 2022, now Pat. No. 12,028,328.

(51) Int. Cl.
*H04L 9/40* (2022.01)
*G06F 16/21* (2019.01)
*G06F 21/31* (2013.01)
*G06F 21/62* (2013.01)

(52) U.S. Cl.
CPC ........ *H04L 63/0807* (2013.01); *G06F 16/217* (2019.01); *G06F 21/31* (2013.01); *G06F 21/6218* (2013.01)

(58) Field of Classification Search
CPC .......................... G06F 21/6218; G06F 16/217
See application file for complete search history.

(56) References Cited

U.S. PATENT DOCUMENTS

| | | | | |
|---|---|---|---|---|
| 6,804,627 | B1* | 10/2004 | Marokhovsky | G06F 11/3452 |
| | | | | 702/182 |
| 2005/0075839 | A1* | 4/2005 | Rotheroe | G05B 15/02 |
| | | | | 702/183 |
| 2012/0278663 | A1* | 11/2012 | Hasegawa | G06F 11/079 |
| | | | | 714/47.1 |
| 2016/0099924 | A1* | 4/2016 | Mehta | H04L 61/4552 |
| | | | | 726/7 |
| 2017/0279669 | A1* | 9/2017 | Tapia | H04L 41/069 |
| 2020/0301940 | A1* | 9/2020 | Hollander | G06F 16/254 |
| 2020/0314084 | A1* | 10/2020 | Watanabe | G06F 21/335 |

(Continued)

OTHER PUBLICATIONS

"U.S. Appl. No. 17/582,868, Notice of Allowance mailed Mar. 4, 2024", 9 pgs.

*Primary Examiner* — James R Turchen
(74) *Attorney, Agent, or Firm* — SCHWEGMAN LUNDBERG & WOESSNER, P.A.

(57) ABSTRACT

Techniques for providing a database performance report in a restricted access environment are disclosed. In some embodiments, a computer system performs a method comprising: receiving, from a computing device of a user, a request to generate a database performance report for a first database that is hosted on a cloud computing platform, the request including a service key; obtaining administrative credentials from a second database using stateless authentication and the service key; obtaining one or more database performance metrics of the first database from the first database using the administrative credentials; and generating the database performance report based on the one or more database performance metrics.

20 Claims, 6 Drawing Sheets

```
300

? PLEASE SELECT YOUR ORGANIZATION: TEST
? PLEASE SELECT YOUR SPACE: POSTGRESQL-REPORTS
? PLEASE SELECT THE POSTGRESQL INSTANCE FOR GENERATING THE REPORT: TEST
? PLEASE SELECT A SERVICE KEY FOR THIS DEPLOYMENT: TEST —310
? PLEASE SELECT WHICH DATABASE CHECKS TO BE EXECUTED: [ALL → GENERATE REPORT USING ALL AVAILABLE CHECKS]
SENDING REQUEST TO: HTTPS://POSTGRESQL-REPORTS.CF.EU10.HANA.ONDEMAND.COM/API/V1/GENERATE_REPORT
> SERVER RESPONSE:
                                                                            310
{
     "DOWNLOAD URL": "HTTPS://POSTGRESQL.REPORTS.CF.EU10.HANA.ONDEMAND.COM/GET_2/
EYJHBGCIOIJIUZUMITSHIDHFOWEJPDWJDWEIFPWJFPJPWMPWEPWEMPWMEDPWMEPWMEPMWPD",
     "LINK VALIDITY(SEC)": 180
}
```

(56) References Cited

U.S. PATENT DOCUMENTS

| | | | |
|---|---|---|---|
| 2021/0019434 A1* | 1/2021 | Bibliowicz | G06F 21/6218 |
| 2022/0351169 A1* | 11/2022 | Kim | G06Q 20/206 |
| 2023/0237178 A1 | 7/2023 | Vassilev | |

* cited by examiner

```
? PLEASE SELECT YOUR ORGANIZATION: TEST
? PLEASE SELECT YOUR SPACE: POSTGRESQL-REPORTS
? PLEASE SELECT THE POSTGRESQL INSTANCE FOR GENERATING THE REPORT: TEST
? PLEASE SELECT A SERVICE KEY FOR THIS DEPLOYMENT: TEST ~310
? PLEASE SELECT WHICH DATABASE CHECKS TO BE EXECUTED: [ALL → GENERATE_REPORT
CHECKS]
SENDING REQUEST TO: HTTPS://POSTGRESQL-REPORTS.CF.EU10.HANA.ONDEMAND.COM/API/V1/GENERATE_REPORT
> SERVER RESPONSE:                                                              310
{
    "DOWNLOAD URL": "HTTPS://POSTGRESQL.REPORTS.CF.EU10.HANA.ONDEMAND.COM/GET_2/
EYJHBGCIOIJIUZUMITSHIDHFOWEJPDWJDWEIFPWJFPJPVWMPWEPWEMPVWMEDPWMEPWMEPMWPD",
    "LINK VALIDITY(SEC)": 180
}
```

*FIG. 3*

PROVIDING DATABASE PERFORMANCE REPORT IN RESTRICTED ENVIRONMENT

CROSS-REFERENCE TO RELATED APPLICATIONS

This application is a continuation of prior application Ser. No. 17/582,868, filed on Jan. 24, 2022, which is incorporated by reference herein in its entirety.

BACKGROUND

A cloud computing platform may provide databases as a service to their users. Each database hosted by the cloud computing platform may be associated with a user account. The cloud computing platform provides users with access to perform certain operations with respect to the database associated with their user account.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates an example graphical user interface (GUI) via which a request to generate a database performance report is received and an expiring link to the database performance report is displayed.

DETAILED DESCRIPTION

Figure 1:
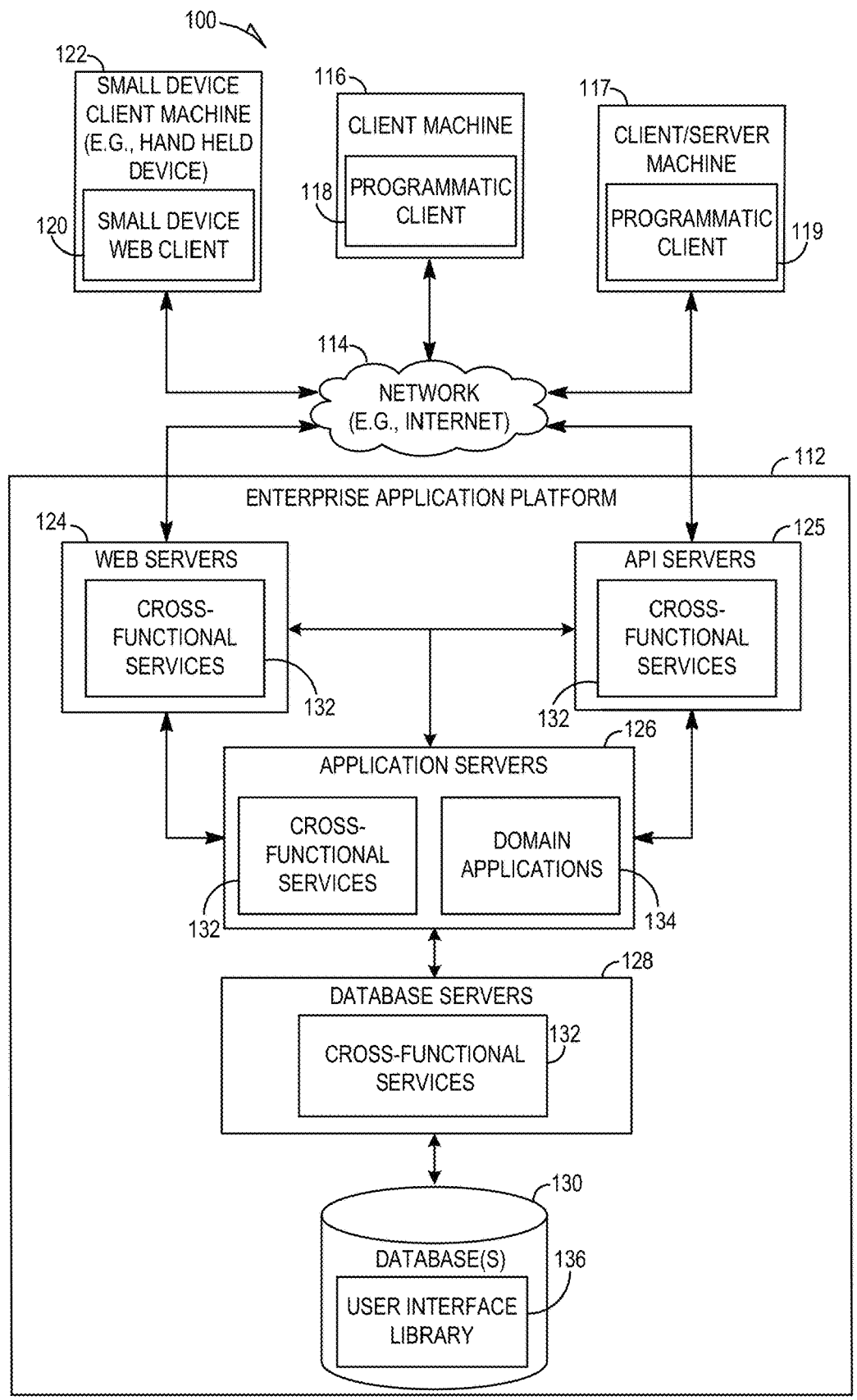
FIG. 1 is an example network diagram illustrating a system.

Example methods and systems for providing a database performance report in a restricted access environment are disclosed. In the following description, for purposes of explanation, numerous specific details are set forth in order to provide a thorough understanding of example embodiments. It will be evident, however, to one skilled in the art that the present embodiments can be practiced without these specific details.

Although cloud computing platforms provide users with access to the databases associated with their user accounts for certain operations, such as read and write operations, they also restrict the access of users to perform other types of operations. Most users are limited to non-administrative user permissions and privileges. As a result, these users are prevented from performing checks on the performance of their databases and generating database performance reports based on such checks, since these checks must be performed against the database using administrative credentials. However, in order to maintain sufficient security, administrative credentials are typically not issued to users. Therefore, a conflict arises between optimizing the performance of a database via database performance reports and optimizing security of the database. As a result, the functioning of both the database and the cloud computing platform suffers. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide a database performance report in a restricted access environment. In order to provide a cloud computing platform with the capability to both optimize the performance of a database via user-requested database performance reports and optimize security of the database, the computer system may use a stateless authentication technique to access the database in the generation of the database performance report and provide an expiring link to the user for accessing the database performance report. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
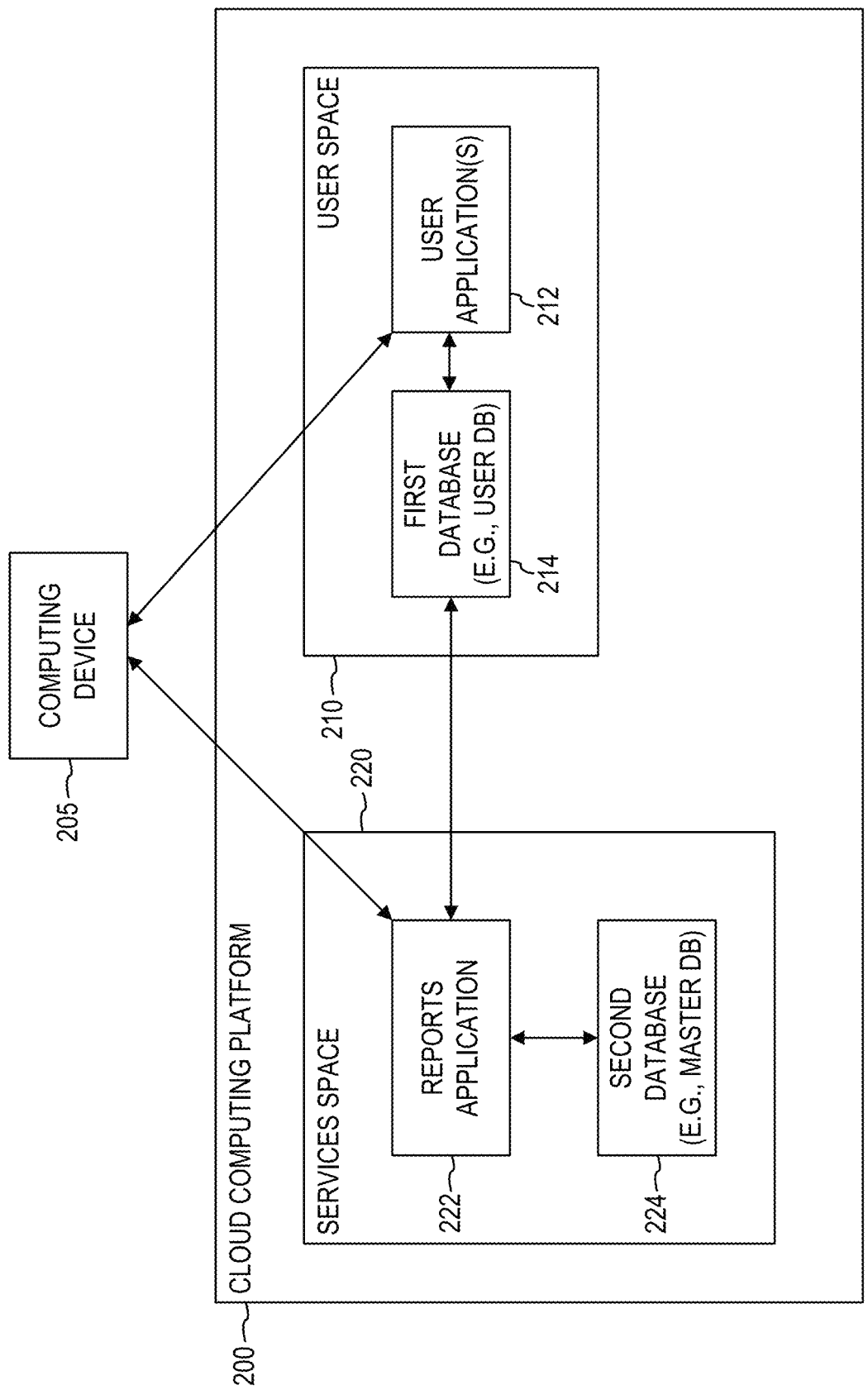
FIG. 2 is a block diagram illustrating an example cloud computing platform.

FIG. 2 is a block diagram illustrating an example cloud computing platform 200. The cloud computing platform 200 may reside in one or more machines each having a memory and at least one processor (not shown). In some example embodiments, the cloud computing platform 200 is implemented by the enterprise application platform 112 of FIG. 1. For example, the cloud computing platform 200 may be incorporated into the application server(s) 126. However, the cloud computing platform 200 may be implemented in other ways as well.

In some example embodiments, the cloud computing platform 200 is configured to provide one or more cloud-based services to a user of a computing device 205. For example, the cloud computing platform 200 may provide one or more user applications 212 within a user space 210 that is dedicated to a user account of the user. As a result of using the user application(s) 212, data may be stored in a first database 214 that is hosted within the user space 210. The first database 214 may comprise a user database in which the user can store data and access data for use with the user application(s) 212. In some example embodiments, the first database 214 is incorporated into a PostgreSQL® database management system. Other configurations of the first database 214 are also within the scope of the present disclosure.

In some example embodiments, the cloud computing platform 200 comprises a reports application 222 that is hosted within a services space 220 of the cloud computing platform. In contrast to the user space 210 that is dedicated to the user account of the user, the services space 220 is not dedicated to the user account of the user, but rather is accessible to all users of the cloud computing platform 200. The reports application 222 may be configured to use a stateless authentication technique to perform checks on the first database 214 in the generation of the database performance report and provide an expiring link to the user of the computing device 205 for accessing the database performance report.

In some example embodiments, the reports application 222 is configured to receive, from the computing device 205 of the user, a request to generate a database performance report for the first database 214. The request may include a service key. A service key is a string of characters that may be used in an application as credentials to directly communicate with a service instance. When service keys are configured for an online service, applications from other another space and outside entities can access the online service using service key. The request may further include one or more types of database performance checks, as well as other parameters for the request.

The reports application 222 may be configured to receive the request via a graphical user interface (GUI). FIG. 3 illustrates an example GUI 300 via which a request to generate a database performance report is received. In the GUI 300, multiple prompts are displayed asking the user to enter or otherwise specify, parameters of the request. For example, in FIG. 3, the GUI 300 prompts the user to enter an identification of an organization, an identification of a user space 210, an identification of a database instance for generating the database performance report, an identification of a service key, and an identification of which database performance checks to perform.

In some example embodiments, the reports application 222 is configured to obtain administrative credentials from a second database 224 using stateless authentication and the service key, at operation 420. The second database 224 may be different from the first database 214 and be hosted on the cloud computing platform 200. The second database 224 comprises a master database 224. The master database may store all of the system-level information for a database management system of the cloud computing platform 200, which may include, but is not limited to, instance-wide metadata, such as logon accounts, endpoints, linked servers, and system configuration settings. The master database may record the existence of all other databases on the cloud computing platform 200 and the details of those databases. Other configurations of the second database 224 are also within the scope of the present disclosure.

In some example embodiments, the stateless authentication used by the reports application 222 to obtain the administrative credentials comprises attempting to connect to the first database 214 using the service key. For example, the reports application 222 may extract a uniform resource identifier (URI) from the service key and post the URI as a JSON request to the first database 214 to establish a connection with the first database 214. Next, at the reports application 222 may determine that the connection to the first database 214 was established using the service key. For example, the reports application 222 may receive a JSON message from the first database 214 indicating that the connection to the first database 215 was established. Then, the reports application 222, in response to the determining that the connection to the first database 214 was established using the service key, may retrieve the administrative credentials from the second database 224. For example, the reports application 222 may access the second database 224 and look up the administrative credentials corresponding to the second database 224. The reports application 222 may obtain the administrative credentials using other types of stateless authentication as well.

In some example embodiments, the reports application 222 is configured to obtain one or more database performance metrics of the first database 214 from the first database 214 using the administrative credentials. The one or more database performance metrics of the first database 214 may be obtained based on the inclusion of the one or more types of database performance checks in the request. For example, the user may specify the types of database performance checks to be performed in generating the database performance report, such as by using the GUI 300 of FIG. 3, and the types of database performance checks specified by the user may be included in the request. The reports application 222 may perform the user-specified types of database performance checks on the first database 214 to obtain the database performance metrics of the first database 214. Examples of types of database performance checks include, but are not limited to, obtaining a detailed view of all tables in the first database 214, obtaining indications of bloat of the tables, obtaining a list of blocked queries, obtaining statistics showing the 10 most CPU intensive queries, obtaining a snapshot of the connected clients for the first database 214, obtaining a database transaction commit ratio, obtaining a database query hit ratio, obtaining an indication of identical definitions of indexes of the first database 214, obtaining statistics about the indexes, obtaining a hot updates ratio, identifying low used indexes, obtaining general information of queries run on the first database 214, obtaining a view of the current users and roles in the first database 214, and obtaining a view of the tables in the first database 214 with the most writes.

In some example embodiments, the reports application 222 is configured to generate a database performance report based on the one or more database performance metrics. For example, the reports application 222 may merge all of the obtained database performance metrics into a single file, such as a Portable Document Format (PDF) file, and this file may be used as the database performance report. The reports application 222 may then store the database performance report in a directory. The directory may comprise a new temporary folder for holding the database performance report. The database performance report may be stored in other ways as well.

In some example embodiments, the reports application 222 is configured to generate an expiring link to the database performance report in the directory. The expiring link may be configured to expire after a predetermined amount of time. For example, the expiring link may be configured to expire 180 seconds after it has been generated by the reports application 222. Alternatively, the expiring link may be configured to expire at a specific time of day (e.g., at 3:00 pm Eastern Standard Time). The reports application 222 may use a hash-based message authentication code (HMAC) and a cryptographic hash function (e.g., Secure Hash Algorithm 512), as well as a secure key generated on the start of the reports application 222 to generate the expiring link. The expiring link may be generated in other ways as well.

In some example embodiments, the reports application 222 is configured to display the expiring link on the computing device 205 of the user. For example, the reports application 222 may return a JavaScript® Object Notation (JSON) response to the computing device 205 with the expiring link and an indication of the time period for which the expiring link is valid. Other ways of displaying the expiring link on the computing device 205 of the user are also within the scope of the present disclosure. In FIG. 3, the GUI 300 displays an expiring link 310 to the database performance report.

Subsequent to the display of the expiring link 310 on the computing device 305 of the user, the reports application 222 may receive a user selection of the expiring link from the computing device 205 before the predetermined amount of time has passed. For example, the expiring link may be configured to expire after 180 seconds and the user may click on or otherwise select the expiring link after 68 seconds has passed. Here, the reports application 222 may then download and display the database performance report on the computing device 205 in response to receiving the user selection of the expiring link from the computing device 205 before the predetermined amount of time has passed.

Additionally or alternatively, the reports application 222 may determine that the determine that the predetermined amount of time has passed, and then delete the database performance report from the directory in response to the determining that the predetermined amount of time has passed. The reports application 222 may then receive a user selection of the expiring link from the computing device 205 after the predetermined amount of time has passed, and display an error message on the computing device 205 in response to the receiving the user selection of the expiring link from the computing device 205 after the predetermined amount of time has passed.

Figure 4:
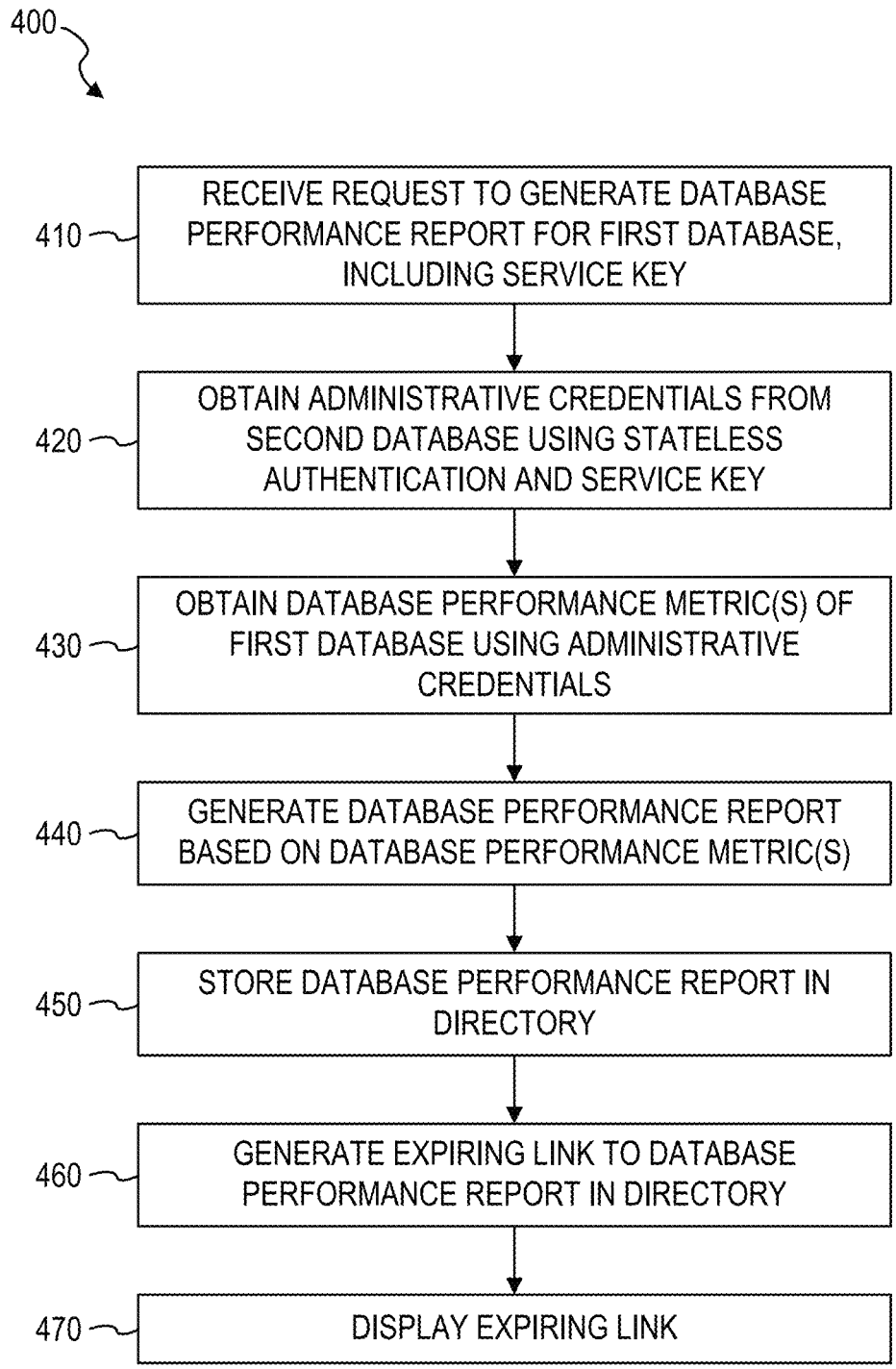
FIG. 4 is a flowchart illustrating an example method of providing a database performance report in a restricted access environment.

FIG. 4 is a flowchart illustrating an example method 400 of providing a database performance report in a restricted access environment. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the reports application 222 of FIG. 2 or any combination of one or more of its components.

At operation 410, the reports application 222 may receive, from a computing device 205 of a user, a request to generate a database performance report for a first database 214 that is hosted on a cloud computing platform 200. The request may include a service key. The request may further include one or more types of database performance checks. In some example embodiments, the request may be received via the GUI 300 of FIG. 3 and may include additional parameters for configuring the generation of the database performance report. The request may be received via other types of GUI's and other input mechanisms as well. In some example embodiments, the first database 214 comprises a user database that is hosted within a user space 210 dedicated to a user account of the user. Other configurations of the first database 214 are also within the scope of the present disclosure.

Next, the reports application 222 may obtain administrative credentials from a second database 224 using stateless authentication and the service key, at operation 420. The second database 224 may be different from the first database 214 and be hosted on the cloud computing platform 200. In some example embodiments, the second database 224 comprises a master database 224. Other configurations of the second database 224 are also within the scope of the present disclosure.

The reports application 222 may then, at operation 430, obtain one or more database performance metrics of the first database 214 from the first database 214 using the administrative credentials. In some example embodiments, the one or more database performance metrics of the first database 214 are obtained based on the inclusion of the one or more types of database performance checks in the request. For example, the user may specify the types of database performance checks to be performed in generating the database performance report, such as by using the GUI 300 of FIG. 3, and the types of database performance checks specified by the user may be included in the request. The reports application 222 may perform the user-specified types of database performance checks on the first database 214 to obtain the database performance metrics of the first database 214.

At operation 440, the reports application 222 may generate the database performance report based on the one or more database performance metrics. For example, the reports application 222 may merge all of the database performance metrics obtained at operation 430 into a single file, such as a Portable Document Format (PDF) file, and this file may be the database performance report.

The reports application 222 may then store the database performance report in a directory, at operation 450. In some example embodiments, the directory comprises a new temporary folder for holding the database performance report. The database performance report may be stored in other ways as well.

Next, at operation 460, the reports application 222 may generate an expiring link to the database performance report in the directory. The expiring link may be configured to expire after a predetermined amount of time. For example, the expiring link may be configured to expire 180 seconds after it has been generated by the reports application 222. Alternatively, the expiring link may be configured to expire at a specific time of day (e.g., at 3:00 pm Eastern Standard Time). In some example embodiments, the reports application 222 uses a hash-based message authentication code (HMAC) and a cryptographic hash function (e.g., Secure Hash Algorithm 512), as well as a secure key generated on the start of the reports application 222 to generate the expiring link.

Then, the reports application 222 may display the expiring link on the computing device 205 of the user, at operation 470. For example, the reports application 222 may return a JavaScript® Object Notation (JSON) response to the computing device with the expiring link and an indication of the time period for which the expiring link is valid. Other ways of displaying the expiring link on the computing device 205 of the user are also within the scope of the present disclosure.

Subsequently, after operation 470 has been performed, the reports application 222 may receive a user selection of the expiring link from the computing device 205 before the predetermined amount of time has passed. For example, the expiring link may be configured to expire after 180 seconds and the user may click on or otherwise select the expiring link after 68 seconds has passed. Here, the reports application 222 may then display the database performance report on the computing device 205 in response to receiving the user selection of the expiring link from the computing device 205 before the predetermined amount of time has passed.

Additionally or alternatively, after operation 470 has been performed, the reports application 222 may determine that the determine that the predetermined amount of time has passed, and then delete the database performance report from the directory in response to the determining that the predetermined amount of time has passed. The reports application 222 may then receive a user selection of the expiring link from the computing device 205 after the predetermined amount of time has passed, and display an error message on the computing device 205 in response to the receiving the user selection of the expiring link from the computing device 205 after the predetermined amount of time has passed.

It is contemplated that any of the other features described within the present disclosure can be incorporated into the method 400.

Figure 5:
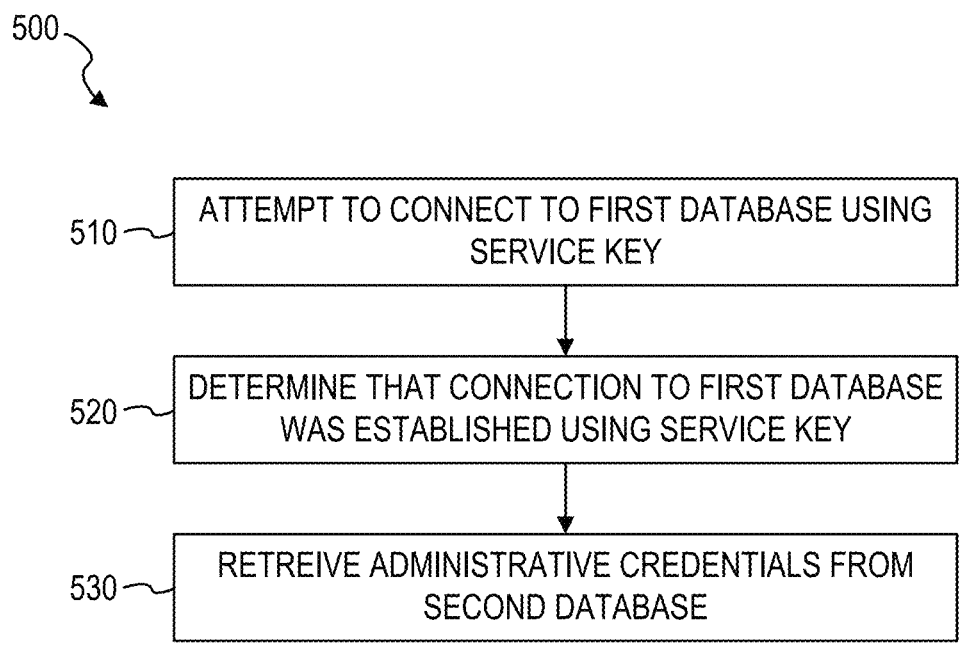
FIG. 5 is a flowchart illustrating an example method of obtaining administrative credentials using stateless authentication and a service key.

FIG. 5 is a flowchart illustrating an example method 500 of obtaining administrative credentials using stateless authentication and a service key. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the reports application 222 of FIG. 2 or any combination of one or more of its components.

At operation 510, the reports application 222 may attempt to connect to the first database 214 using the service key. For example, the reports application 222 may extract a uniform resource identifier (URI) from the service key and post the URI as a JSON request to the first database 214 to establish a connection with the first database 214.

Next, at the reports application 222 may determine that the connection to the first database 214 was established using the service key, at operation 520. For example, the reports application 222 may receive a JSON message from the first database 214 indicating that the connection to the first database 215 was established.

Then, at operation 530, the reports application 222, in response to the determining that the connection to the first database 214 was established using the service key, may retrieve the administrative credentials from the second database 224. For example, the reports application 222 may access the second database 224 and look up the administrative credentials corresponding to the second database 224.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving, from a computing device of a user, a request to generate a database performance report for a first database that is hosted on a cloud computing platform, the request including a service key; obtaining administrative credentials from a second database using stateless authentication and the service key, the second database being different from the first database and being hosted on the cloud computing platform; obtaining one or more database performance metrics of the first database from the first database using the administrative credentials; and generating the database performance report based on the one or more database performance metrics.

Example 2 includes the computer-implemented method of example 1, further comprising: storing the database performance report in a directory; generating an expiring link to the database performance report in the directory, the expiring link being configured to expire after a predetermined amount of time; and displaying the expiring link on the computing device of the user.

Example 3 includes the computer-implemented method of example 1 or example 2, further comprising: receiving a user selection of the expiring link from the computing device before the predetermined amount of time has passed; and displaying the database performance report on the computing device in response to receiving the user selection of the expiring link from the computing device before the predetermined amount of time has passed.

Example 4 includes the computer-implemented method of any one of examples 1 to 3, further comprising: determining that the predetermined amount of time has passed; deleting the database performance report from the directory in response to the determining that the predetermined amount of time has passed; receiving a user selection of the expiring link from the computing device after the predetermined amount of time has passed; and displaying an error message on the computing device in response to the receiving the user selection of the expiring link from the computing device after the predetermined amount of time has passed.

Example 5 includes the computer-implemented method of any one of examples 1 to 4, wherein the obtaining the administrative credentials comprises: attempting to connect to the first database using the service key; determining that a connection to the first database was established using the service key; and in response to the determining that the connection to the first database was established using the service key, retrieving the administrative credentials from the second database.

Example 6 includes the computer-implemented method of any one of examples 1 to 5, wherein the first database comprises a user database that is hosted within a user space dedicated to a user account of the user.

Example 7 includes the computer-implemented method of any one of examples 1 to 6, wherein the second database comprises a master database.

Example 8 includes the computer-implemented method of any one of examples 1 to 7, wherein the request further includes one or more types of database performance checks, and the one or more database performance metrics of the first database are obtained based on the inclusion of the one or more types of database performance checks in the request.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 9.

Example 11 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
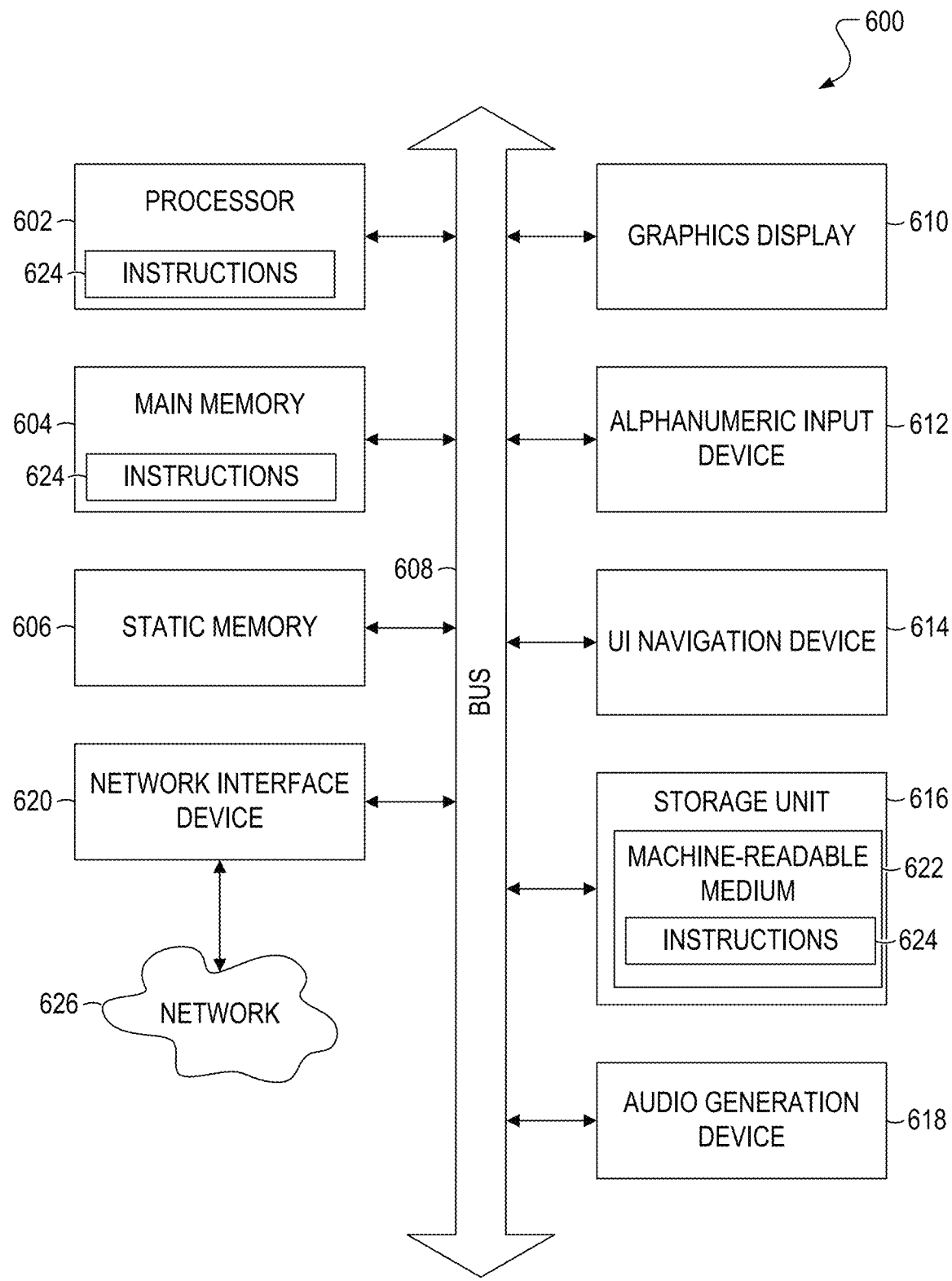
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
   receiving, from a computing device of a user, a request to generate a performance report for a first component that is hosted on a cloud computing platform, the request including a service key;
   obtaining administrative credentials from a second component using stateless authentication and the service key, the second component being different from the first component and being hosted on the cloud computing platform;
   obtaining one or more performance metrics of the first component from the first component using the administrative credentials; and
   generating the performance report based on the one or more performance metrics.

2. The computer-implemented method of claim 1, further comprising:
   storing the performance report in a directory;
   generating an expiring link to the performance report in the directory, the expiring link being configured to expire after a predetermined amount of time; and
   displaying the expiring link on the computing device of the user.

3. The computer-implemented method of claim 2, further comprising:
   receiving a user selection of the expiring link from the computing device before the predetermined amount of time has passed; and
   displaying the performance report on the computing device in response to receiving the user selection of the expiring link from the computing device before the predetermined amount of time has passed.

4. The computer-implemented method of claim 2, further comprising:

determining that the predetermined amount of time has passed;
deleting the performance report from the directory in response to the determining that the predetermined amount of time has passed;
receiving a user selection of the expiring link from the computing device after the predetermined amount of time has passed; and
displaying an error message on the computing device in response to the receiving the user selection of the expiring link from the computing device after the predetermined amount of time has passed.

5. The computer-implemented method of claim 1, wherein the obtaining the administrative credentials comprises:
attempting to connect to the first component using the service key;
determining that a connection to the first component was established using the service key; and
in response to the determining that the connection to the first component was established using the service key, retrieving the administrative credentials from the second component.

6. The computer-implemented method of claim 1, wherein the first component comprises a component that is hosted within a user space dedicated to a user account of the user.

7. The computer-implemented method of claim 1, wherein the second component comprises a master database.

8. The computer-implemented method of claim 1, wherein the request further includes one or more types of performance checks, and the one or more performance metrics of the first component are obtained based on inclusion of the one or more types of performance checks in the request.

9. A system of comprising:
at least one hardware processor; and
a non-transitory computer-readable medium storing executable instructions that, when executed, cause the at least one hardware processor to perform operations comprising:
receiving, from a computing device of a user, a request to generate a performance report for a first component that is hosted on a cloud computing platform, the request including a service key;
obtaining administrative credentials from a second component using stateless authentication and the service key, the second component being different from the first component and being hosted on the cloud computing platform;
obtaining one or more performance metrics of the first component from the first component using the administrative credentials; and
generating the performance report based on the one or more performance metrics.

10. The system of claim 9, wherein the operations further comprise:
storing the performance report in a directory;
generating an expiring link to the performance report in the directory, the expiring link being configured to expire after a predetermined amount of time; and
displaying the expiring link on the computing device of the user.

11. The system of claim 10, wherein the operations further comprise:
receiving a user selection of the expiring link from the computing device before the predetermined amount of time has passed; and
displaying the performance report on the computing device in response to receiving the user selection of the expiring link from the computing device before the predetermined amount of time has passed.

12. The system of claim 10, wherein the operations further comprise:
determining that the predetermined amount of time has passed;
deleting the performance report from the directory in response to the determining that the predetermined amount of time has passed;
receiving a user selection of the expiring link from the computing device after the predetermined amount of time has passed; and
displaying an error message on the computing device in response to the receiving the user selection of the expiring link from the computing device after the predetermined amount of time has passed.

13. The system of claim 9, wherein the obtaining the administrative credentials comprises:
attempting to connect to the first component using the service key;
determining that a connection to the first component was established using the service key; and
in response to the determining that the connection to the first component was established using the service key, retrieving the administrative credentials from the second component.

14. The system of claim 9, wherein the first component comprises a component that is hosted within a user space dedicated to a user account of the user.

15. The system of claim 9, wherein the second component comprises a master database.

16. The system of claim 9, wherein the request further includes one or more types of performance checks, and the one or more performance metrics of the component are obtained based on inclusion of the one or more types of performance checks in the request.

17. A non-transitory machine-readable storage medium tangibly embodying a set of instructions that, when executed by at least one hardware processor, causes the at least one processor to perform operations comprising:
receiving, from a computing device of a user, a request to generate a performance report for a first component that is hosted on a cloud computing platform, the request including a service key;
obtaining administrative credentials from a second component using stateless authentication and the service key, the second component being different from the first component and being hosted on the cloud computing platform;
obtaining one or more performance metrics of the first component from the first component using the administrative credentials; and
generating the performance report based on the one or more performance metrics.

18. The non-transitory machine-readable storage medium of claim 17, wherein the operations further comprise:
storing the performance report in a directory;
generating an expiring link to the performance report in the directory, the expiring link being configured to expire after a predetermined amount of time; and
displaying the expiring link on the computing device of the user.

19. The non-transitory machine-readable storage medium of claim 18, wherein the operations further comprise:
    receiving a user selection of the expiring link from the computing device before the predetermined amount of time has passed; and
    displaying the performance report on the computing device in response to receiving the user selection of the expiring link from the computing device before the predetermined amount of time has passed.

20. The non-transitory machine-readable storage medium of claim 18, wherein the operations further comprise:
    determining that the predetermined amount of time has passed;
    deleting the performance report from the directory in response to the determining that the predetermined amount of time has passed;
    receiving a user selection of the expiring link from the computing device after the predetermined amount of time has passed; and
    displaying an error message on the computing device in response to the receiving the user selection of the expiring link from the computing device after the predetermined amount of time has passed.

* * * * *